April 12, 1932.  W. A. FLUMERFELT  1,853,121

BEARING JOINT

Filed April 26, 1930

INVENTOR
William A. Flumerfelt.
BY
ATTORNEYS.

Patented Apr. 12, 1932

1,853,121

UNITED STATES PATENT OFFICE

WILLIAM A. FLUMERFELT, OF COLUMBUS, OHIO, ASSIGNOR TO THE COLUMBUS AUTO PARTS COMPANY, A CORPORATION OF OHIO

BEARING JOINT

Application filed April 26, 1930. Serial No. 447,483.

This invention relates to bearings particularly of the ball and socket type.

The main objects of this invention are to provide an improved construction of bearing which is adjustable to compensate for wear; to provide an improved type of ball and socket joint bearing in which a maximum of wearing surface is provided in the socket for bearing against the ball; to provide an improved construction of ball and socket joint in which the surrounding socket members are moved radially toward the ball when adjustment is made to compensate for wear; to provide an improved construction which may be manufactured with ease and economy and which may be readily assembled in snug and compact relationship.

An illustrative embodiment of this invention is shown in the accompanying drawings, in which Fig. 1 is a fragmentary view in perspective of a front axle and steering assembly for a motor vehicle showing the use of my improved invention.

Figure 1:
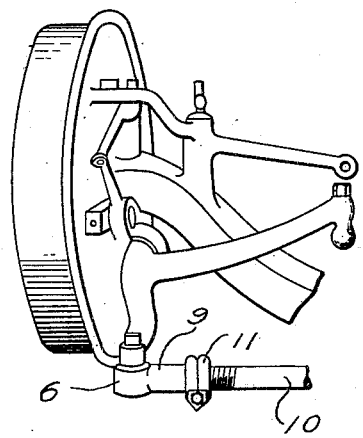

Heretofore, ball and socket joints have been made which are adjustable to compensate for wear but such devices commonly employ a pair of interposed eccentrically curved wedge members, the outsides of which are straight in axial direction and the inner face of which has a ball seat formed therein. Great difficulty has been experienced in forming a ball seat in a curved wedge member with the axis of the seat eccentric with respect to the outer surface of the wedge. A coining operation is practically the only successful way in which such a member can be formed and even with the coining process it presents many difficulties which increase the cost of the product.

When such eccentric wedges are used on a ball and wear occurs therein these eccentric wedges, when adjusted to a new position, will not be normally contacting on their original faces of the ball. Due to the wear which has occurred on the face of the ball the eccentric wedges will then make point contact on the ball and not have a full face fit thereagainst.

In my improved construction the ball is embraced by a pair of concentric socket members which may be easily shaped from straight bar stock having a concave face and curved wedges are then provided for embracing the socket members and fitting between them and the surrounding housing. When adjustment occurs due to wear, the socket members move radially toward the center of the ball, maintaining their fitting contact with the original faces of the ball and thus maintaining proper uniform fit at all times.

In the construction shown in the drawings, an outer casing 6 having an annular recess 7 therein is provided with an inturned flange 8 at one end thereof and an interiorly threaded shank 9 in which a tie rod 10 or other member may be threaded as is customary in such constructions. The shank 9 is preferably split near its outer end and provided with a contracting clamp 11 for retaining the tie rod in adjusted position therein.

An inner member in the form of a ball 12 is eccentrically positioned within the annular recess 7 and a shank 13 integrally formed on the ball 12 extends through the opening provided by the inturned flange 8.

Figure 2:
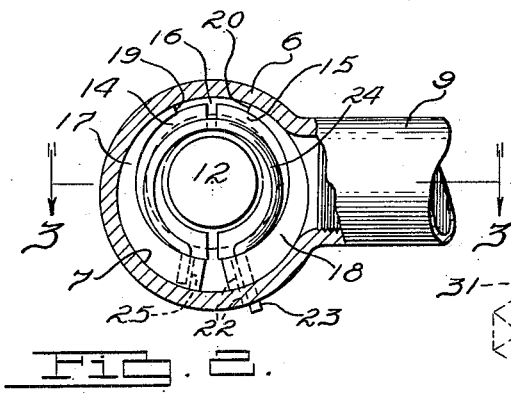
Fig. 2 is a fragmentary sectional view taken on the line 2—2 of Fig. 3 looking in the direction indicated by the arrows.

A pair of substantially semi-circular socket members 14 and 15 snugly embrace the ball 12 and are normally in spaced relation to each other as shown at 16 in Fig. 2 of the drawings. The inner faces of the socket members 14 and 15 are formed on the same radius as the outer surface of the ball 12 so as to snugly and uniformly fit therearound.

The outer surfaces of the socket members 14 and 15 are circumferentially curved concentrically with respect to the center of the ball 12 and are straight in an axial direction so as to present a cylindrical form.

A pair of wedge members 17 and 18 are interposed between the outer sides of the socket members and the walls of the annular recess 7. The wedge members 17 and 18 are assembled in opposed relation as shown in Fig. 2 of the drawings and are so proportioned that their thin ends 19 and 20, respectively, are in substantial spaced relationship so that they may be moved circumferentially relative to each other for adjusting the socket members 14 and 15 radially toward the ball 12 to compensate for wear.

The wedge members 17 and 18 are of substantially greater axial length than the socket members 14 and 15 so that when assembled in the annular recess within the housing in abutting relationship against the inturned flange 8, an annular space 21 will be provided below the ball 12 and socket members 14 and 15.

The wedge member 18 and outer housing 6 are provided with registering apertures 22 through which projects the radially extending out-turned end 23 of a spring 24 for anchoring the wedge to the housing 6. The spring 24 is composed of substantially one turn of round spring wire and is housed within the space 21 as shown most clearly in Fig. 3 of the drawings. The opposite end of the spring 24 is also turned outwardly in a radially extending direction and projects into an aperture 25 provided in the wedge member 17 for engaging the wedge and causing it to rotate circumferentially toward the anchored wedge member 18.

A relatively shallow inverted cup-shaped plate 26 is provided in the end of the annular recess 7 opposite to the flange 8, for closing the recess and holding the parts therein in assembled relationship in addition to the end 23 of the spring 24 which anchors the wedge 18 to the housing 6.

Figure 4:
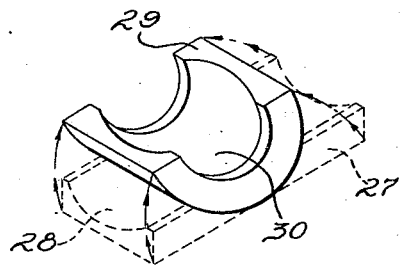
Fig. 4 is a view in perspective showing the formation of a ball socket member formed by rolling up a straight piece of stock material, the straight piece of stock being shown in dotted outline.

The socket members are preferably formed from straight pieces of rolled bar stock 27 each of which has a longitudinally extending concave face 28. These pieces may be sheared off from lengths of rolled stock. The straight pieces are then rolled up as shown by the arrows in Fig. 4 of the drawing, thus forming a socket member 29 which has a substantially spherical face 30 therein. By subjecting the rolled up piece to the action of a forming die, the face 30 is trued so as to have the exact curvature of the ball against which it is to be assembled.

Figure 5:
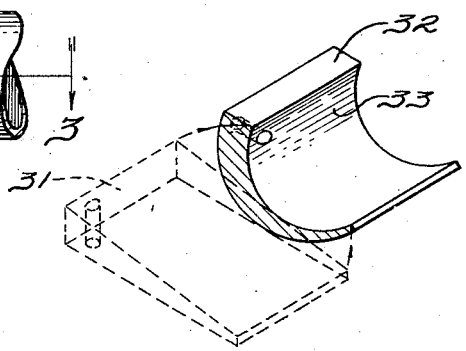
Fig. 5 is a view in perspective showing the formation of a curved wedge by rolling up a straight piece of wedge-shaped stock material, such straight piece being shown in dotted outline.

In the formation of the wedge member, sections 31 are cut from a length of rolled bar stock which is wedge-shape in cross-section. These pieces 31 are then rolled up as shown by the arrows in Fig. 5, to form a curved wedge 32 which has an inner face 33 eccentrically disposed with respect to its outer face. These wedges may be formed by a single operation and do not require any additional truing up.

Figure 3:
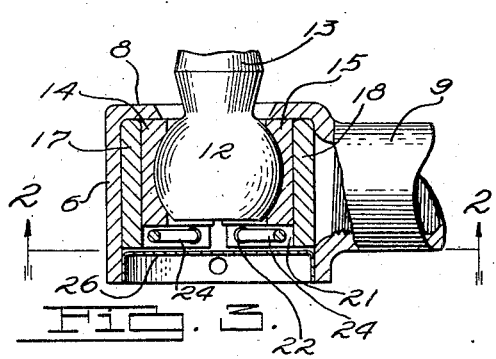
Fig. 3 is a sectional view taken on the line 3—3 of Fig. 2 looking in the direction indicated by the arrows.

In the operation of this improved ball and socket joint the parts are assembled as shown in Figs. 2 and 3 with the wedge member 18 anchored to the housing by the protruding end 23 of the spring 24. The resilient yielding action of the spring 24 tends to constantly urge the wedge 17 circumferentially around the annular recess 7 toward the wedge 18 thus tightening the socket members 14 and 15 around the ball 12, their movement toward the ball being in a substantially radial direction. Sufficient clearance is allowed as shown at 16 to provide for a long period of use before the adjacent ends of the socket members come in contact with each other and thereby prevent further tightening around the ball.

By reason of the socket members moving radially toward the ball 12 rather than rotating circumferentially thereabout, the contacting surfaces of the socket members always engage the original contacting faces of the ball and do not change position thereon, thus insuring a good fit at all times even after a long period of wear and adjustment has elapsed.

The area of contact of the socket members is substantially 360° on the face of the ball and by reason of this large area of contact the amount of wear between the ball and socket members is very materially reduced over all existing automatically adjusting constructions now in use.

Although but one specific embodiment of this invention has been herein shown and described, it will be understood that numerous details of the construction shown may be altered or omitted without departing from the spirit of this invention as defined by the following claims.

I claim:

1. In a bearing, an outer housing having an annular recess therein, an inner member eccentrically positioned within said recess, a pair of wedge members interposed between said inner member and said housing in opposed relationship, a spring having one end anchoring one of said wedge members to said housing and the other end thereof engaging the other of said wedge members for tightening it around said inner member.

2. In a bearing, an outer housing, an inner member, a pair of spaced bearing bushings surrounding said inner member, a pair of wedge members interposed between said bushings and said housing in opposed relationship, means for anchoring one of said wedge members to said housing and means for moving the other of said wedge members for tightening said bushings around said inner member.

3. In a bearing, an outer housing, an inner member, a pair of spaced bearing bushings surrounding said inner member, a pair of wedge members interposed between said bushings and said housing in opposed relationship, means for anchoring one of said wedge members to said housing, and automatic means for moving the other of said wedge members for tightening said bushings around said inner member.

4. In a bearing, an outer housing, an inner member, a pair of spaced bearing bushings surrounding said inner member, a pair of wedge members interposed between said bushings and said housing in opposed relationship, a spring having one end anchoring one of said wedge members to said housing and the other end thereof engaging the other of said wedge members for tightening said bushings around said inner member.

5. A ball and socket joint comprising an outer housing having an annular recess therein, an inturned flange at one end of said recess, a ball member positioned within said recess, a shank on said ball member extending through the opening formed by said flange, a pair of concentric socket members embracing said ball member, said socket members being normally in spaced relation to each other, a pair of eccentric wedge members interposed between the inner walls of said recess and outer sides of said socket members for moving said socket members radially toward said ball member, means for anchoring one of said wedge members and means for actuating the other of said wedge members.

6. A ball and socket joint comprising an outer housing having an annular recess therein, an inturned flange at one end of said recess, a ball member positioned within said recess, a shank on said ball member extending through the opening formed by said flange, a pair of concentric socket members embracing said ball member, said socket members being normally in spaced relation to each other, a pair of eccentric wedge members interposed between the inner walls of said recess and the outer sides of said socket members for moving said socket members radially toward said ball member, a spring having one end anchoring one of said wedge members to said housing and the other end thereof engaging the other of said wedge members for tightening said bushings around said ball member.

7. A ball and socket joint comprising an outer housing having an annular recess therein, an inturned flange at one end of said recess, a ball member positioned within said recess, a shank on said ball member extending through the opening formed by said flange, a pair of concentric socket members embracing said ball member, said socket members being normally in spaced relation to each other, a pair of eccentric wedge members interposed between the inner walls of said recess and outer sides of said socket members for moving said socket members radially toward said ball member, means for anchoring one of said wedge members, and automatic yielding means for actuating the other of said wedge members.

8. A ball and socket joint comprising an outer housing having an annular recess therein, an inturned flange at one end of said recess, a ball member positioned within said recess, a shank on said ball member extending through the opening formed by said flange, a pair of concentric socket members embracing said ball member, said socket members being normally in spaced relation to each other, a pair of eccentric wedge members interposed between the inner walls of said recess and outer sides of said socket members for moving said socket members radially toward said ball member, said wedge members being of greater axial length than said socket members so as to provide an annular space below said ball and socket members, one of said wedge members and said housing having registering apertures therein, and a spring housed in said annular space, one end of said spring extending through said apertures to anchor said apertured wedge to said housing, and the other end of said spring engaging the other of said wedges for moving it circumferentially around said housing to tighten said socket members around said ball member.

WILLIAM A. FLUMERFELT.